O. H. & A. F. PIEPER.
DENTAL ENGINE.
APPLICATION FILED AUG. 7, 1909.
1,011,239.
Patented Dec. 12, 1911.
3 SHEETS—SHEET 1.
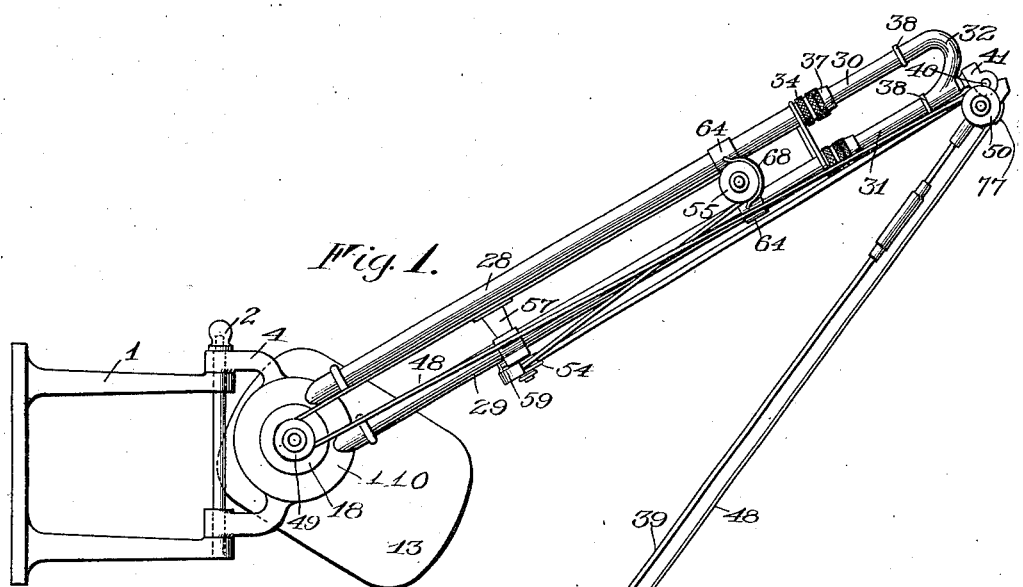
Fig. 1.
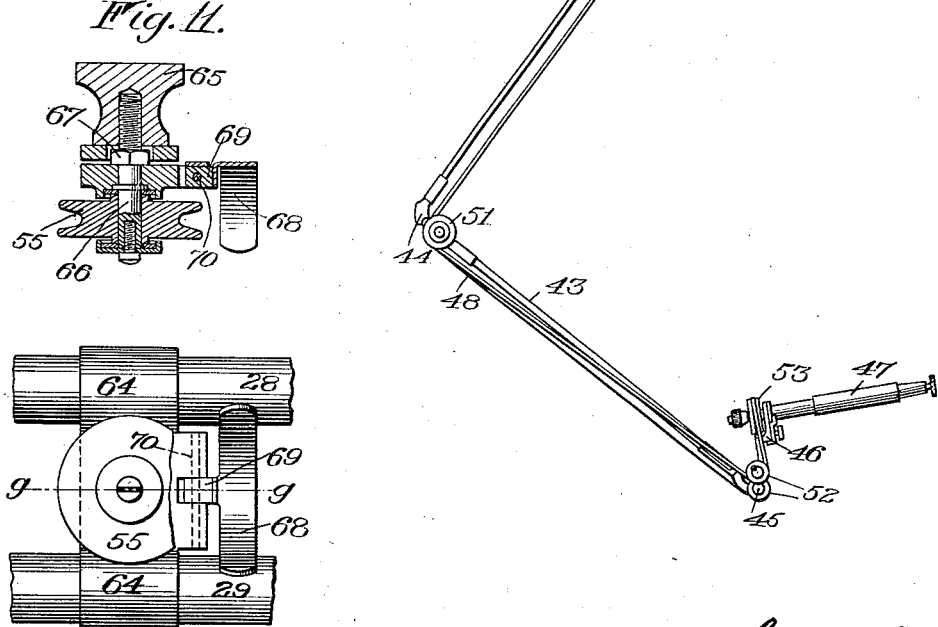
Fig. 4.
Fig. 10.
Witnesses
Walter B. Payne.
H. H. Simms
Inventors
Oscar H. & Alphons Pieper
By Church & Rich
their Attorneys

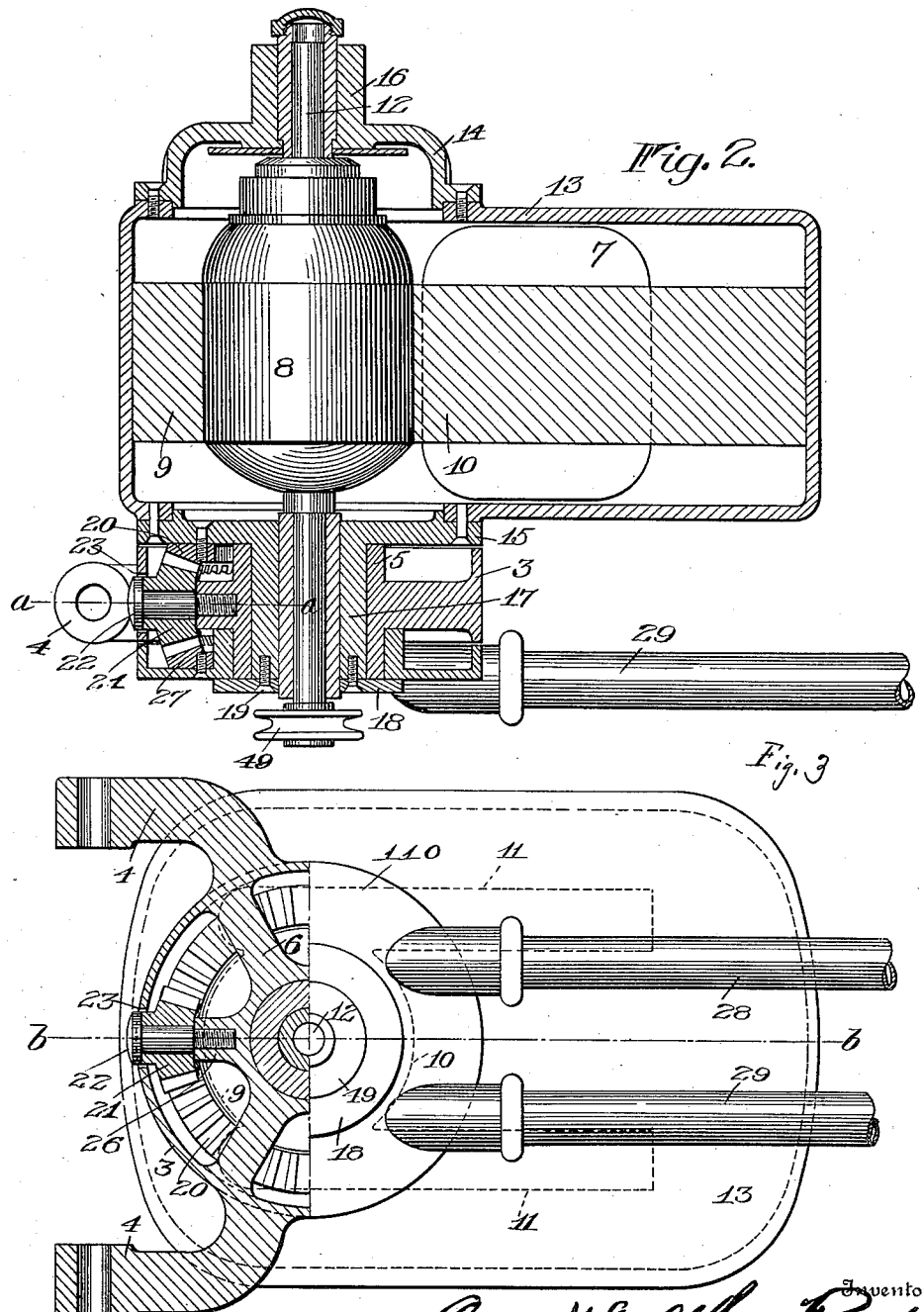

O. H. & A. F. PIEPER.
DENTAL ENGINE.
APPLICATION FILED AUG. 7, 1909.
1,011,239.
Patented Dec. 12, 1911.
3 SHEETS—SHEET 3.
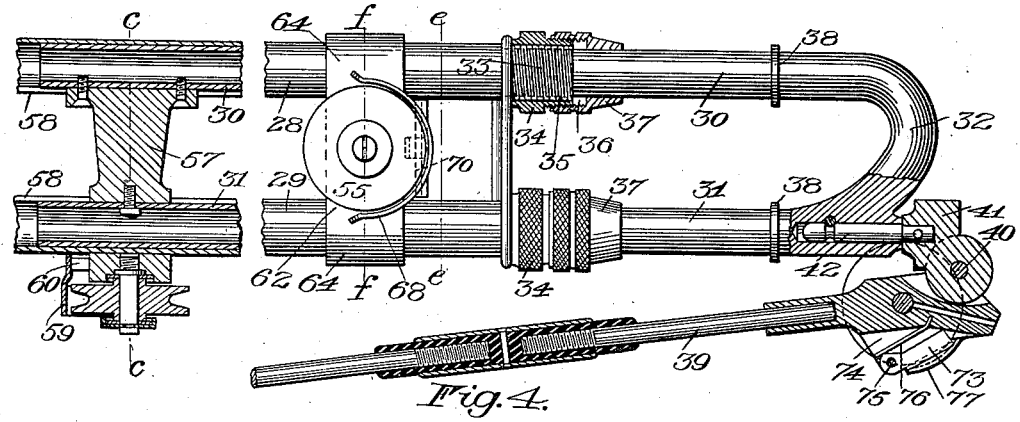
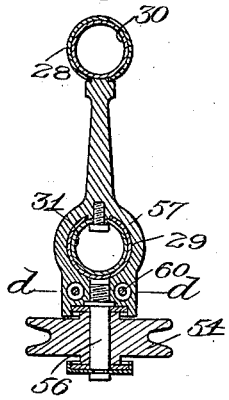
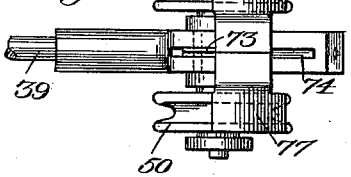
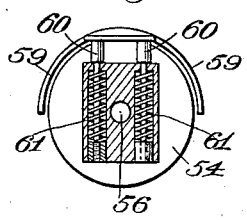
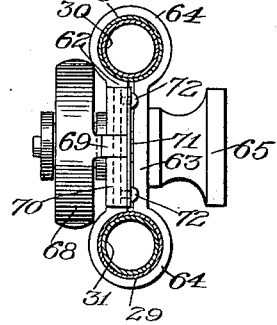
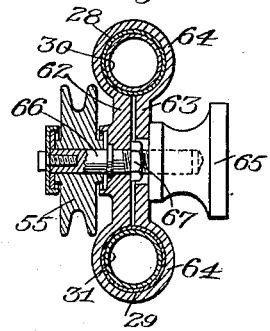
Witnesses
Walter B. Payne
S. H. H. Simms
Inventors
Oscar H. & Alphons Pieper
By Emrich & Riel
Attorneys

UNITED STATES PATENT OFFICE.

OSCAR H. PIEPER AND ALPHONSE F. PIEPER, OF ROCHESTER, NEW YORK.

DENTAL ENGINE.

1,011,239.  Specification of Letters Patent.  Patented Dec. 12, 1911.

Application filed August 7, 1909. Serial No. 511,770.

*To all whom it may concern:*

Be it known that we, OSCAR H. PIEPER and ALPHONSE F. PIEPER, of Rochester, in the county of Monroe and State of New York, have invented certain new and useful Improvements in Dental Engines; and we do hereby declare the following to be a full, clear, and exact description of the same, reference being had to the accompanying drawings, forming a part of this specification, and to the reference-numerals marked thereon.

The present invention relates to dental engines and it has for its object to provide an improved manner of balancing the supporting arm and parts carried thereby whereby a compact arrangement is obtained.

Still another object of the invention is to improve the parts in order to obtain greater durability and to obviate the slipping of the driving cable from its guide pulleys.

To these and other ends the invention consists of certain improvements and combinations of parts all as will be hereinafter more fully described, the novel features being pointed out in the claims at the end of the specification.

In the drawings: Figure 1 is a side-rim of a dental engine constructed in accordance with the present invention; Fig. 2 is a sectional view of the motor illustrating the mounting of the latter and its connection with the supporting arm; Fig. 3 is an enlarged detail view, partially in section, on the line $a$—$a$ of Fig. 2, the line $b$—$b$ on Fig. 3 indicating the section on which Fig. 2 is taken; Fig. 4 is an enlarged detail view of the forward end of the supporting arm, partially in section, the pendant arm also being shown as attached thereto and partially in section; Fig. 5 is a detail view of the upper end of the pendant arm; Fig. 6 is a section on the line $c$—$c$ of Fig. 4; Fig. 7 is a section on the line $d$—$d$ of Fig. 6; Fig. 8 is a section on the line $e$—$e$ of Fig. 4; Fig. 9 is a section on the line $f$—$f$ of Fig. 4; Fig. 10 is a detail view of one of the guide pulleys showing the cable retaining guard moved to open position, and Fig. 11 is a section on the line $g$—$g$ of Fig. 10.

In the present embodiment of the invention there is employed a wall bracket 1 of any suitable construction having mounted thereon for turning about a vertical axis 2 a frame which comprises preferably a ring-shaped member 3, arms 4 extending therefrom for attachment to the bracket 1, and a central sleeve 5 held in spaced relation to the ring by radial arms 6. The internal wall of the sleeve 5 serves as a bearing for a counterbalancing device, while the external wall is engaged by one end 110 of the hand-piece supporting-arm, said end being of disk formation so as to close one side of the ring 3.

Preferably the motor is utilized for counterbalancing the supporting arm. In this instance an electrical motor is employed which has its field windings 7 located to one side of its armature 8, the pole 9 being connected to the pole 10 by arms 11 extended on opposite sides of the field. This arrangement causes the shaft 12 to be positioned eccentrically to the motor so that the greater weight of the motor lies to one side of the shaft. The field and armature are inclosed by a casing 13 which has its opposite walls closed by plates 14 and 15 carrying bearings 16 and 17 for the armature or motor shaft. The external face of bearing 17 coöperates with the internal bearing face of the sleeve 5 and is held within the sleeve by an annular disk 18, screwed or otherwise secured as at 19 to the outer end of the bearing so as to coöperate with the proximate end of the sleeve 5. In order that the motor may counterbalance the supporting arm and the parts carried by the latter there is employed a connection preferably in the form of a gearing comprising a segmental crown gear 20 secured to the outer face of the casing plate 15 concentric with the motor shaft and sleeve 5 and meshing with a pinion 21 which turns about an axis radial to the motor shaft. This pinion is preferably mounted on the pin 22 removable through an opening 23 in the ring 5 and screw threaded at one end to engage a stud 26 projecting from the sleeve 5. The pinion 21 in turn meshes with a segmental crown gear 27 secured to the disk end of the supporting arm concentric with the bearing which turns on the sleeve 5. It will thus be seen that the crown gear 20 is moved by a depression of the supporting arm so as to move the pinion 21, which in turn moves the crown gear 27 on the disk end of the supporting arm and thereby elevates the balance. The elevation of the supporting arm by the counterbalance reverses the operation.

The supporting arm comprises preferably a pair of hollow tubes 28 and 29 arranged one over the other and extending from the disk portion 110 to receive a slide constituted in this instance of two rods 30 and 31 connected at their outer ends at 32. This slide permits the length of the supporting arm to be varied to correspond to the position at which the operator desires to locate the tool and in order to prevent the slide moving too freely in the rods 28 and 29 the latter are at their outer ends externally threaded at 33 to receive collars 34 forming abutments 35 for packings 36, said collars 34 also being externally threaded so as to be engaged by internal threaded collars 37 which form abutments for the opposite sides of the packing and permit the latter to be compressed against the external faces of the tubes 30 and 31 to produce a frictional braking action on the latter while permitting the sliding movement. Stops 38 may be provided on the tubes 30 and 31 to limit the inward movement of the slides.

At the outer end of the slide there may be provided a pendant arm 39 which has a hinged connection at 40 with the member 41, permitting said pendant arm to swing about an axis transverse to its length, the member 41 acting in turn as a connection 42 with the outer end of the slide permitting the pendant arm to swing about an axis extending in the direction of the length of the slide. The connection 41 in this instance is in the form of a pin rotatably mounted in the slide in alinement with the rod 31 so that the arm 39 may be caused to lie parallel with the supporting arm. At the lower end of the pendant arm is arranged a hand piece connecting arm 43 pivotally connected in any suitable manner 44 with the arm 39 and pivotally connected at 45 with the laterally extending arm 46 on the hand piece 47 which may carry any suitable tool.

In order to drive the tool in the hand piece from the motor shaft 12 an endless cable 48 is provided and passes about a pulley 49 on the motor shaft with one strand thereof leading directly to one of the pair of pulleys 50 arranged on the upper end of the pendant arm 29, thence downwardly to one of the pair of pulleys 51 arranged on the connecting arm 43, thence to one of a pair of pulleys 52 on the laterally extending arm 46 and about a pulley 53. From the pulley 53 the cable returns to the other of the pulleys 52, thence to the other pulley 51, thence to the other pulley 50, thence to a pulley 54 arranged on the underside of the supporting arm, thence to a pulley 55 arranged on one vertical side of the supporting arm and finally back to the motor pulley 49. The pulley 54 preferably turns on a vertically arranged stub shaft 56 screw threaded into the lower portion of the casing or member 57 that is secured to the rods 30 and 31 near their inner free ends and is guided in slots 58 formed in the opposed walls of the tubes 28 and 29, a portion of the member 57 being extended about the tube 29 so as to be guided on the external surfaces of the latter. This member 57 in addition to forming a support for the pulley 54 serves to maintain the rods 30 and 31 in properly spaced relation and at the same time acts as a support for a cable retainer that prevents the cable 48 leaving the pulley 54. Preferably this cable retainer comprises a guard portion 59 conforming substantially to the periphery of the pulley and having on the upper and inner side of the pulley, arms 60 which are guided in the member 57 and are surrounded by springs 61 serving to maintain the guard in proper position while at the same time permitting the latter to be moved away from the pulley in order that the cable may be withdrawn from or passed about the latter.

The outer or free ends of the tubular rods 28 and 29 may be held in spaced relation by a device comprising preferably two clamping members or jaws 62 and 63 said jaws being connected at their proximate ends by clamps 64, in this instance in the form of sleeves surrounding the respective tubes. These clamps are operated by a single means comprising preferably a thumb wheel or piece 65 having screw threaded engagement with the jaw 62 and coöperating with the jaw 63 to draw the latter toward the jaw 62. Preferably the jaw 62 carries a pin which extends from opposite faces thereof and has a bearing portion 66 at one end serving as a support for pulley 55 and a screw threaded portion at the other end, extending through the jaw 63 and engaged by the thumb piece 65.

The pulley 55 may have associated therewith a cable retaining device and to this end there is provided a guard portion 68 having an arm 69 turning about a vertical axis 70 on the clamping jaw 62, a flat or leaf spring 71 being secured at both ends as at 72 and engaging the arm 69 to retain the guard 68 in either of two positions, one permitting the cable to leave the pulley and the other retaining the cable upon the pulley. The pair of pulleys 50 may also have associated therewith cable retaining devices which in this instance are formed from a single piece of sheet metal bent or folded intermediate of its ends to provide a rib 73 pivoted within a slot 74 formed in the pendant arm 39 between the pulleys 50, the portions of the metal on opposite sides of the rib 73 being bent to conform to the peripheries of the pulleys 50 and provide a double guard. A spring 76 within the slot 74 coöperates with the rib 73 in proximity to the pivot 75 and retains the guard portions 77 in and out of coöperative relation with the pulleys 50.

With the parts arranged as shown in Fig. 1 it is apparent that the tool 47 may be raised either by swinging the arm 43 about the axis 44 or elevating the supporting arm about its pivot. The forward movement of the tool may be produced either by extending the supporting arm or by swinging the arm 39 about the axis 40, while sidewise movement of the tool is produced by shifting the pendant arm about the axis 42 or turning the supporting arm about axis 2.

It is apparent that the supporting arm maintains any position in which it is adjusted owing to the fact that the motor is a counterbalance for said arm and the parts carried thereby. As the motor is pivotally mounted independently of the arm it is possible to mount the engine in a much smaller space than is possible when the motor is carried directly by the supporting arm in rear of the pivot of the latter, and when the supporting arm is swung about the axis 2 the motor does not project therefrom in an opposite direction to engage objects located in its path. The driving cable is insured by the retaining devices against leaving accidentally the pulleys while at the same time the attachment and the removal of the cable is not retarded.

We claim as our invention:

1. The combination with a hand piece and supporting arm therefor mounted to turn about a horizontal axis, of a counterbalancing device for the arm and the hand piece also mounted to turn about a horizontal axis, and gearing between said arm and said counterbalancing device having provision for effecting the elevation of the counterbalancing device with the depression of the arm and to restore the supporting arm to its normal position.

2. The combination with a hand piece and a supporting arm therefor mounted to turn about a horizontal axis, of a crown gear adapted to be moved by the depression of the supporting arm, a counterbalancing device, a crown gear adapted to be moved by the latter, and a pinion interposed between the two gears in such a manner that the counter-balancing device acts to counterbalance the supporting arm.

3. The combination with a frame having a rigid sleeve thereon, of a supporting arm journaled about the sleeve, a counterbalancing device turning in the sleeve, a crown gear adapted to be moved by the depression of said supporting arm, a crown gear adapted to be moved by the downward movement of the counterbalancing device, and a pinion journaled on the frame and meshing with both crown gears in such a manner that the counter-balancing device acts to counterbalance the supporting arm.

4. In a dental engine, the combination with a hand piece and a supporting arm therefor mounted to turn about a horizontal axis, of a motor for driving the shaft of the hand piece movably mounted independently of the supporting arm, and connection between the motor and the supporting arm causing the latter to be counterbalanced by the former.

5. In a dental engine, the combination with a hand piece and a supporting arm therefor mounted to turn about the horizontal axis, of a frame for supporting said supporting arm mounted to swing about a vertical axis, a motor for driving the shaft of the hand piece movably mounted on said frame, independently of the supporting arm, and a gearing connecting the supporting arm and the motor to cause the latter to counterbalance the former.

6. The combination with a hand piece and a supporting arm therefor mounted to turn about a horizontal axis, of a motor pivotally mounted independently of the supporting arm, and connection between the motor and the supporting arm causing the latter to be counterbalanced by the former.

7. The combination with a hand piece and a supporting arm therefor mounted to turn about a horizontal axis, of a pivotally and independently mounted motor, and gearing connecting the supporting arm and the motor to cause the latter to counterbalance the former.

8. The combination with a hand piece and a supporting arm therefor mounted to turn about a horizontal axis, of a pivotally and independently mounted motor, a crown gear connected to the arm, a crown gear connected to the motor, and a pinion meshing with both gears.

9. The combination with a bearing sleeve, of a motor arranged to one side of the sleeve and having a portion turning in the latter, an arm turning on the sleeve, a hand piece carried by the arm, and gearing connecting the motor and the arm to cause the latter to be counterbalanced by the motor.

10. The combination with a frame comprising a ring-shaped member, a centrally arranged bearing sleeve and radially arranged arms connecting the sleeve with the ring-shaped member, of a motor arranged to close one side of the ring-shaped member and having an eccentrically arranged portion turning in the sleeve, a supporting arm turning on the sleeve and adapted to close the other side of the ring-shaped frame, a hand piece carried by the supporting arm, a crown gear on the motor, a crown gear on the supporting arm, and a pinion arranged within the ring-shaped frame and meshing with the crown gears.

11. In a dental engine, the combination with a hand-piece supporting-arm embodying two rods, of a spacing device carrying two clamps each engaging one of the rods, and a single operating member for the clamps.

12. In a dental engine, the combination with a hand-piece supporting-arm embodying two rods, of a spacing device carrying two clamps formed by a pair of jaws having clamping portions near each end, and a single means for moving the jaws together.

13. In a dental engine, the combination with a hand-piece supporting-arm embodying two rods, of a spacing device formed of two jaws connected at their ends by sleeves engaging the rods, a thumb nut having screw threaded engagement with one jaw and coöperating with the other jaw to effect the clamping of the rods by the sleeves.

14. In a dental engine, the combination with a hand-piece supporting-arm embodying two rods, of a spacing member formed of two jaws having clamping ends engaging the rods, a pin secured to one jaw projecting from opposite faces of the jaw and having a bearing portion at one end and a screw threaded portion at the other end projecting through the other jaw, a pulley turning on the bearing portion, and a thumb wheel operating on the screw to force the jaws together.

15. In a dental engine, the combination with the supporting arm and hand piece, of a pulley supported at one side on the supporting arm to act as a guide for a driving cable for the hand-piece, and a retaining device for the cable supported on the inner side of the pulley.

16. In a dental engine, the combination with a hand-piece supporting-arm embodying two rods, of a spacing device connecting the rods, a pulley mounted on the spacing member in a plane between the rods but in a plane to one side of the plane of the rods, and a cable retaining device movably mounted on the spacing member on the inner side of the pulleys.

17. In a dental engine, the combination with a hand-piece supporting-arm embodying a pivotally mounted member having two tubular rods, one of which is longitudinally slotted, a slide having two rods movable in the pivotally mounted member, of a member secured to the slide operating through the slotted tube and guided on the other tube, a pulley mounted at the lower end of the last mentioned member, and a cable retaining device movably supported on the inner and upper side of the pulley.

18. In a dental engine, the combination with a hand-piece supporting-arm, of a pair of pulleys for the driving cable supported on the outer end of the arm, and a double guard for the pulleys movably supported between the latter.

19. In a dental engine, the combination with a handpiece supporting-arm, of a pendant arm connected to the outer end of the supporting-arm and provided with a slot, a pair of pulleys arranged on opposite sides of the slot, and a double guard for the pulleys having a rib pivoted in the slot.

OSCAR H. PIEPER.
ALPHONSE F. PIEPER.

Witnesses:
RUSSELL B. GRIFFITH,
HAROLD H. SIMMS.

---

Copies of this patent may be obtained for five cents each, by addressing the "Commissioner of Patents, Washington, D. C."